Figure 1:
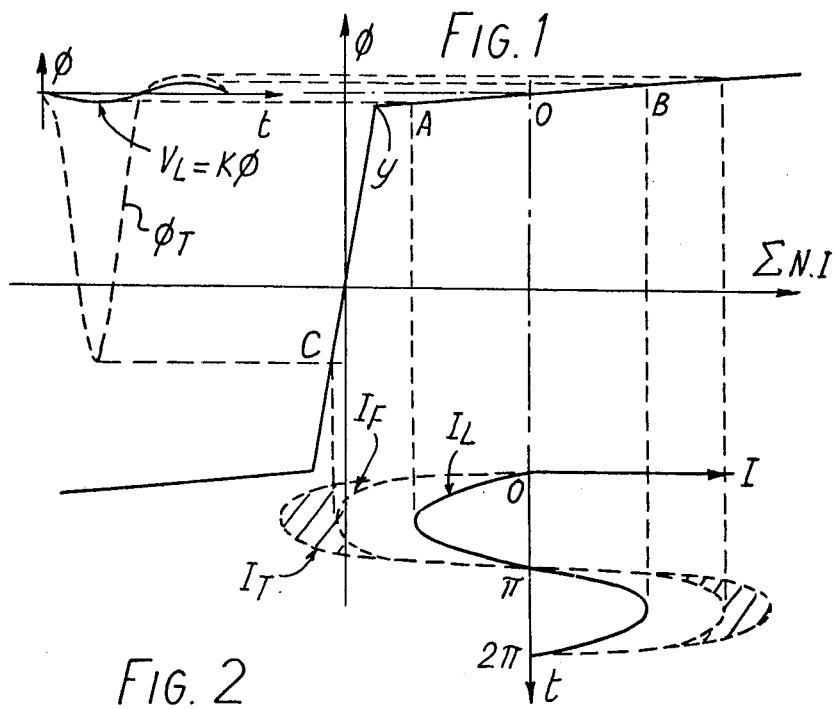

United States Patent [19]
Parton

[11] 4,045,823
[45] Aug. 30, 1977

[54] CURRENT LIMITING DEVICES FOR ALTERNATING CURRENT SYSTEMS

[75] Inventor: Kenneth Charles Parton, Sutton Coldfield, England

[73] Assignee: Reyrolle Parsons Limited, Newcastle upon Tyne, England

[21] Appl. No.: 648,980

[22] Filed: Jan. 14, 1976

[30] Foreign Application Priority Data

| Jan. 17, 1975 | United Kingdom | 2027/75 |
| Jan. 20, 1975 | United Kingdom | 2481/75 |
| Oct. 3, 1975 | United Kingdom | 40629/75 |

[51] Int. Cl.² ............................................. G05F 1/04
[52] U.S. Cl. ......................................... 361/58; 323/9; 336/DIG. 1
[58] Field of Search .............. 317/16, 20, 11 C, 13 D; 307/20, 88, 245, 306, 237; 323/9, 44 F; 336/DIG. 1, 155; 335/216

[56] References Cited

U.S. PATENT DOCUMENTS

| 3,221,280 | 11/1965 | Malsbary et al. | 336/155 X |
| 3,567,954 | 3/1971 | Mitsui et al. | 307/20 |
| 3,629,690 | 12/1971 | Massar | 323/9 |
| 3,671,810 | 6/1972 | Barnes et al. | 317/20 |

*Primary Examiner*—Harry E. Moose, Jr.
*Attorney, Agent, or Firm*—Robert F. O'Connell

[57] ABSTRACT

A current-limiting device for A.C. systems comprises saturable reactors with superconducting bias windings which maintain the reactors in saturation for normal A.C. loads. Excess current drives one of the reactors out of saturation on alternate half-cycles and thus creates a large flux change with accompanying back EMF to limit the current. The device is applicable to the connection of electric power distribution systems to limit fault currents and to allow power transfer without loss of stability.

16 Claims, 14 Drawing Figures

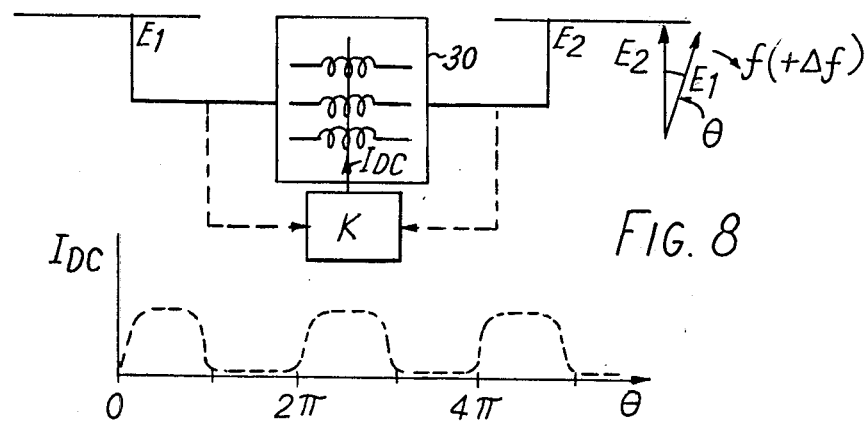
FIG. 8
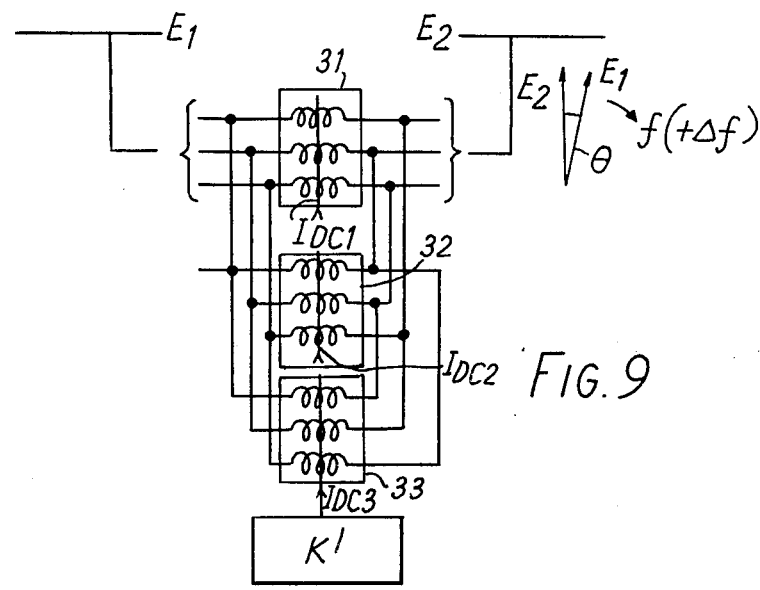
FIG. 9
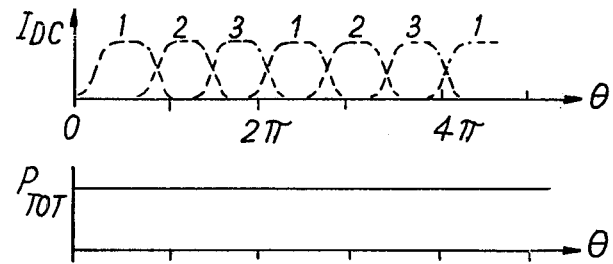

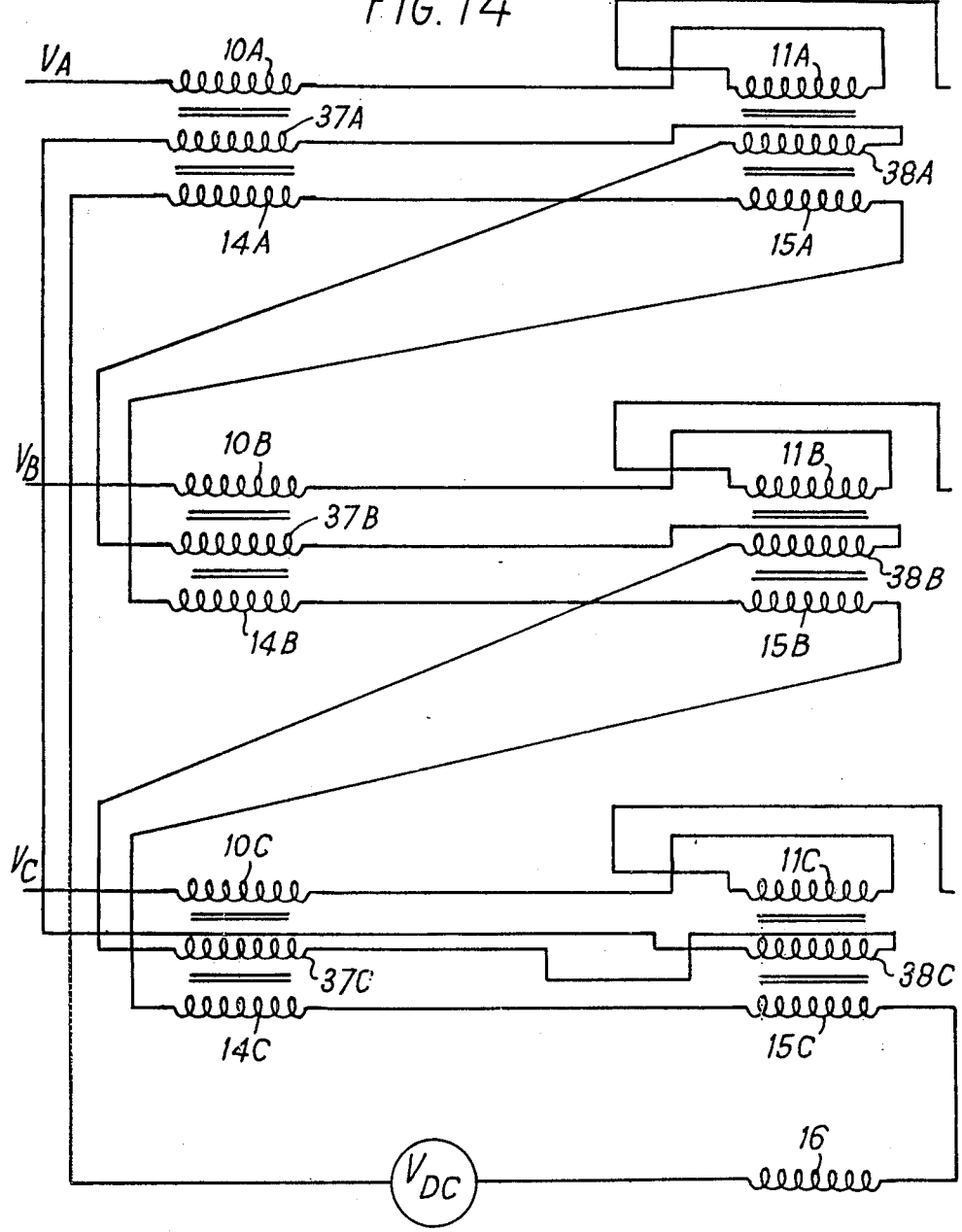

CURRENT LIMITING DEVICES FOR ALTERNATING CURRENT SYSTEMS

The present invention relates to current-limiting devices for alternating-current supply and distribution systems.

It is an object of the invention to provide a current-limiting device capable of better performance in such alternating current systems, for a comparable expenditure, than existing current-limiting devices. For example such devices are required to prevent the current in any branch of an alternating current network exceeding a designed limit, even in the event of a short circuit or switching overload. The devices must operate under initial transient conditions and/or steady state, balanced or unbalanced conditions, and preserve system stability. Such devices will reduce the demands made on the switch gear of the system and other components which are affected by the system fault level rating.

In accordance with the invention there is provided a current-limiting device for an alternating-current system comprising for each phase of the system at least two iron-cored saturable reactors, each reactor having an alternating current winding and a direct current superconducting bias winding, the bias winding being capable of maintaining the core of the reactor saturated under full load alternating current conditions, and an air-gap magnetic core linking the bias winding, the alternating current windings in each phase being so arranged and connected that under full load conditions a change in the level of saturation in any one reactor core relative to the bias level due to the bias winding alone is accompanied by a compensating change in saturated level in another core or cores, current limiting occurring when on each half cycle one or other of the cores is forced out of saturation.

The current-limiting level of the device can be varied by changing the current supplied to the bias winding, or by the use of a central winding on the air-gap core acting as a flux pump.

Figure 2:
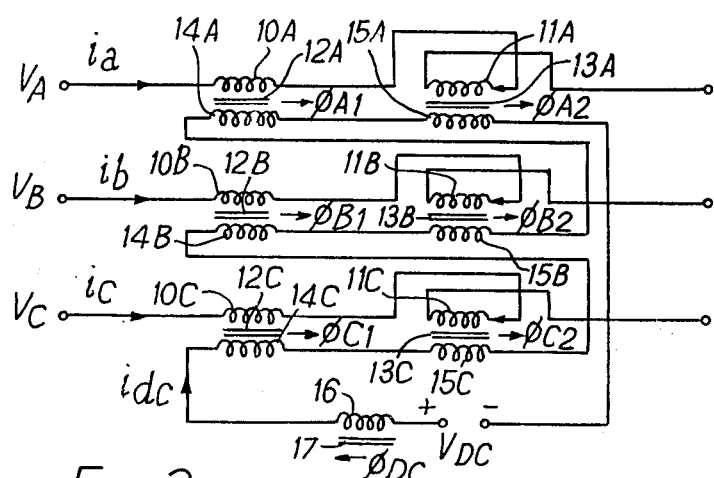
Figure 3:
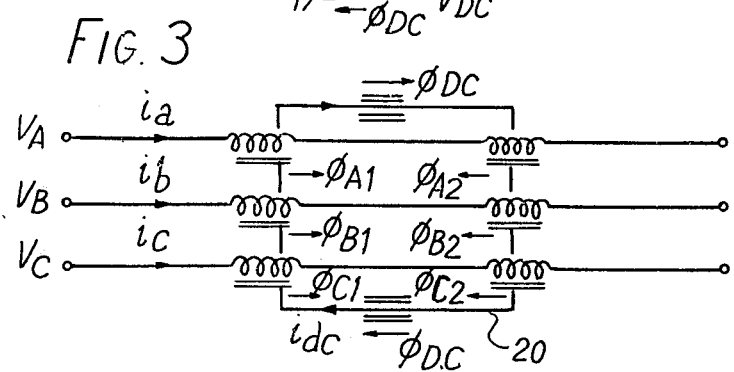
Figure 4:
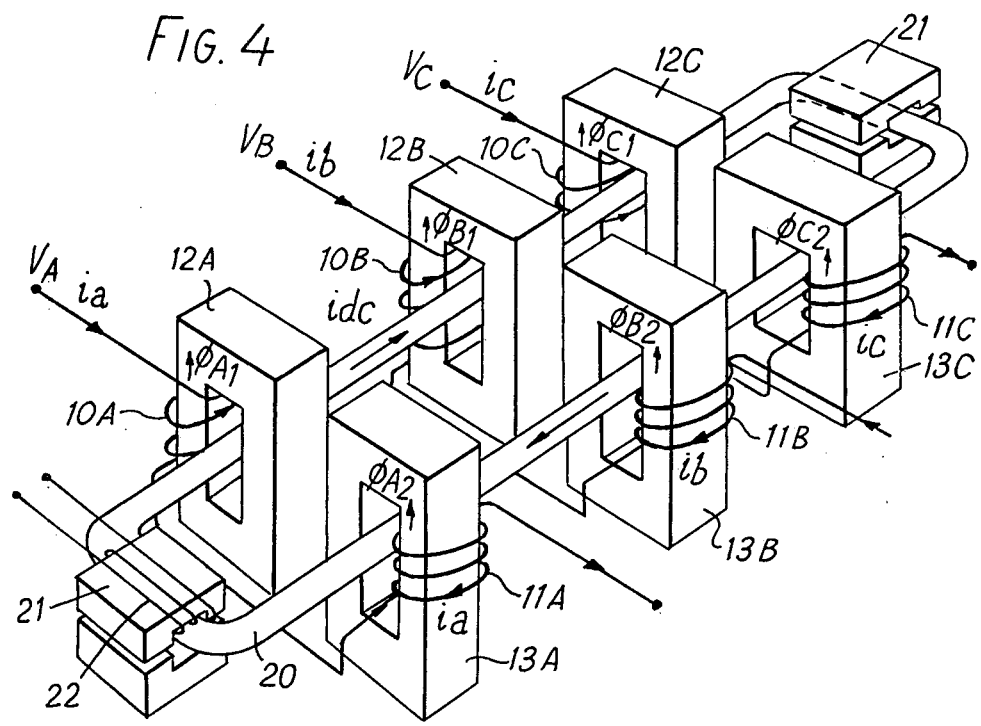
Figure 5:
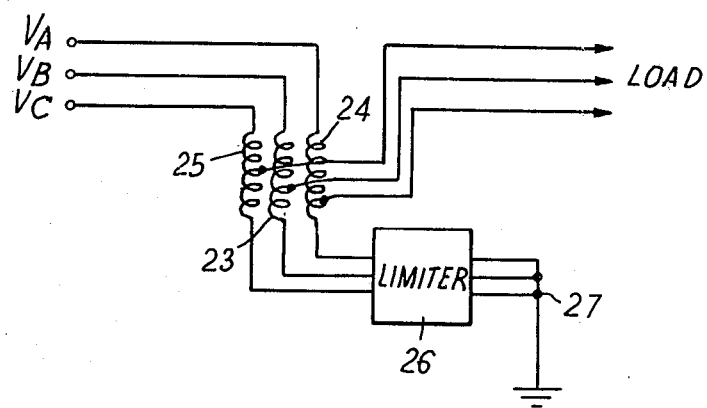
Figure 6:
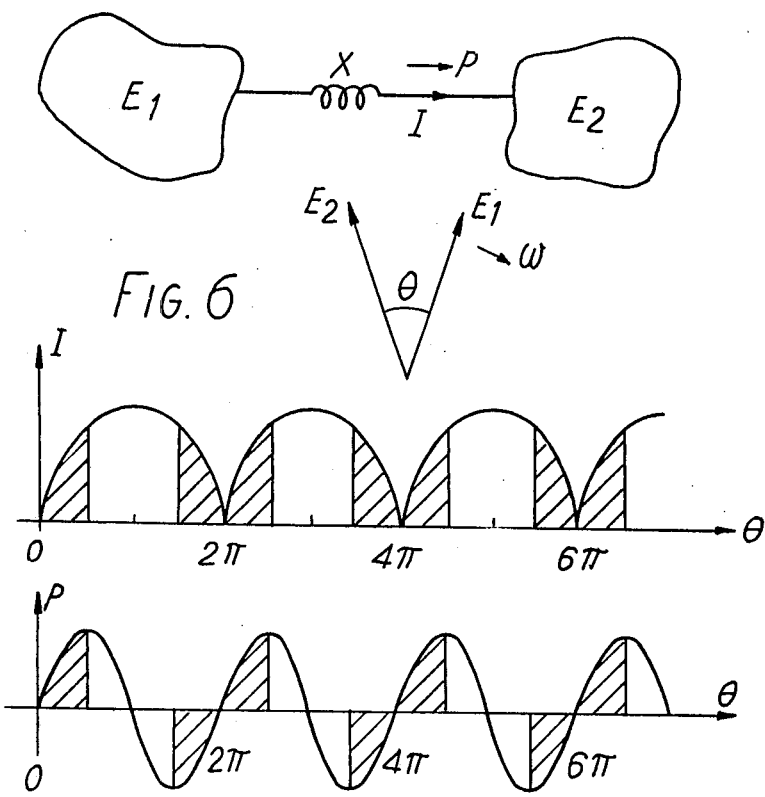
Figure 7:
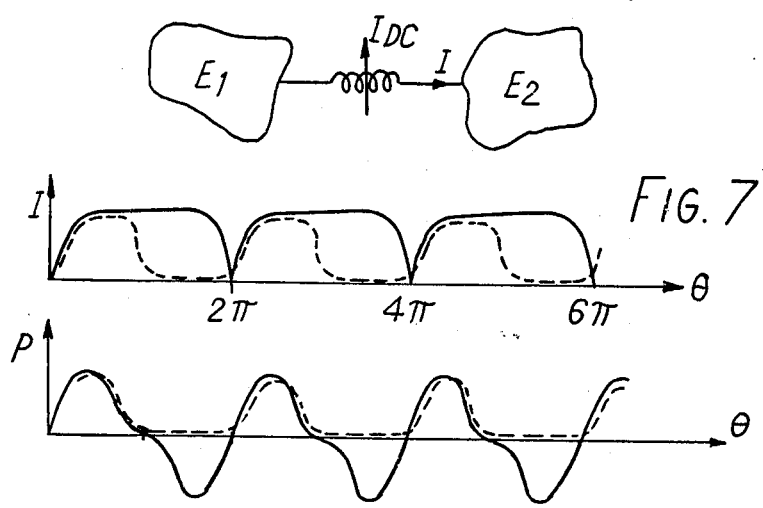
Figure 10:
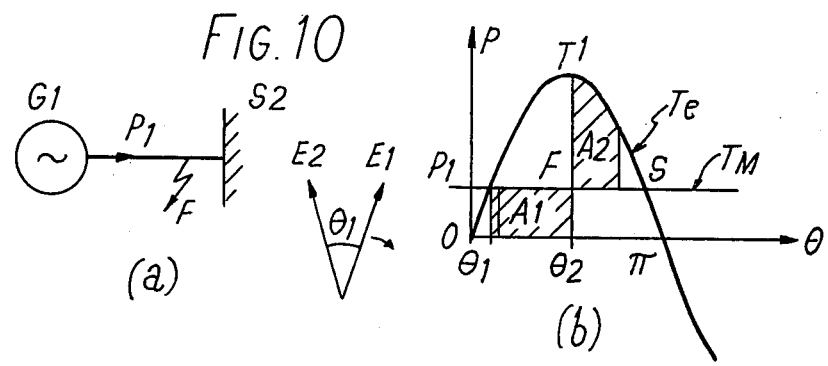
Figure 11:
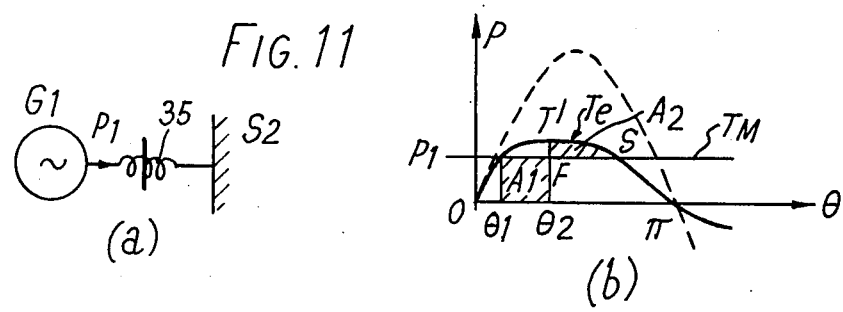
Figure 12:
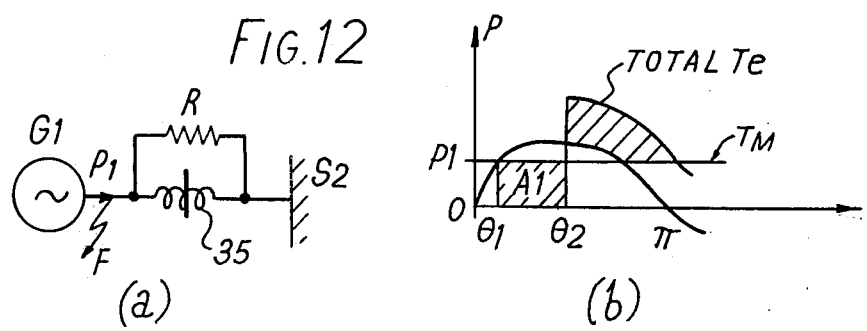
Figure 13:
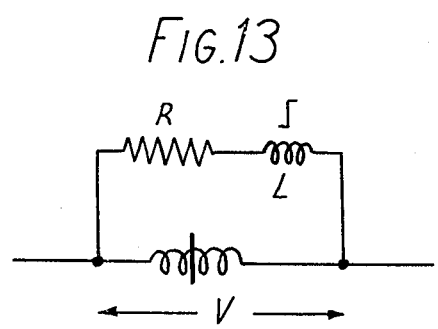

The invention will now be described in more detail with the aid of examples illustrated in the accompanying drawings, in which:

FIG. 1 is a graph of flux against magnetising ampere turns for a saturable reactor used in a current-limiting device in accordance with the invention, showing flux and current waveforms illustrating the current-limiting operation, FIG. 2 is a schematic circuit diagram for a current-limiting device in accordance with the invention, FIG. 3 is a schematic circuit diagram of a modification of the device of FIG. 2, FIG. 4 shows diagrammatically one embodiment of the invention, FIG. 5 is a circuit diagram showing one mode of connection of a current-limiting device to an alternating current system, FIG. 6 shows schematically a connection between two alternating current supply systems with different characteristics and the current and power flow between them as a function of the electrical displacement, FIG. 7 shows diagrams similar to those of FIG. 6 for an arrangement in which two alternating current supply systems are connected by way of a current-limiting device in accordance with the invention, FIG. 8 shows schematically the connection of two three-phase alternating current supply systems for pulsed power transfer by means of a current-limiting device in accordance with the invention, together with diagrams of the current and power transfer as a function of electrical displacement between the two systems, FIG. 9 shows a modification of the arrangement of FIG. 8 to ensure continuous power transfer, FIG. 10 illustrates stability conditions for a conventional power supply system in the event of a fault by means of a diagram (a) of the system and a graph (b) of the power transfer as a function of the phase angle, FIG. 11 illustrates in a manner similar to FIG. 10 the stability conditions for a generator connected to a distribution system by way of a current-limiting device in accordance with the invention, FIG. 12 illustrates in a manner similar to FIG. 10 how the circuit of FIG. 11 can be modified to improve stability, and FIG. 13 shows a further modification of the circuit of FIG. 12, FIG. 14 is a circuit diagram similar to FIG. 2 but showing an additional mesh winding coupling the reactor cores.

FIG. 1 shows the relationship of flux $\phi$ and magnetising ampere turns $\Sigma NI$ for an iron core of a saturable reactor of the type used in a current-limiting device in accordance with the invention. The curve has a "knee" at the saturation point $y$. Normally the D.C. control current in a bias winding maintains the core in a saturated condition at the point O of the curve and the normal full load current $I_L$ in the alternating current winding causes a sinusoidal variation of the flux $\phi$ about the point O between points A and B, the core remaining saturated. There is in consequence a residual series voltage drop of $V_L = K.\Delta\phi$ across the saturable reactor where $\Delta\phi$ is the flux change between points O and A and K is a constant.

Upon the occurrence of a fault, however, an increase in load current will, the negative half cycle, force the flux $\phi_T$ down below the point $y$ to a point such as C, causing a large flux swing and hence an induced EMF acting in opposition to the supply voltage. The fault current is thereby limited and would follow the curve $I_F$ but an additional component is required to supply the increased ampere turns needed by the self inductance of the bias winding, resulting in a total current $I_T$. The self inductance of the bias winding is designed to remain linear in the control region or to suit the particular current limitation required.

It will be appreciated that if the alternating current winding is split into two equal halves on separare iron cores and these are connected with opposite polarities relative to a common direct current bias winding, the second core will operate in a similar manner to that described above but during the opposite half cycle of the alternating current. The device will thus be symmetrical in its effect on the alternating current and no fundamental components of current or flux will be induced in the direct current winding. The alternating current under fault conditions is not sinusoidal for the simple case illustrated but in practice the waveform $I_F$ can readily be modified.

The circuit diagram of FIG. 2 shows a three-phase alternating current system having voltages $V_A$, $V_B$ and $V_C$ and currents $i_a$, $i_b$ and $i_c$, respectively, in the three phases. Each phase includes two windings 10 and 11 (which are given the suffixes A, B and C in the drawing to indicate the phases to which they belong) which are connected in series and arranged on separate saturable reactor cores 12 and 13 in opposite senses. The cores 12 and 13 have series connected direct current control windings 14 and 15, respectively, all the control windings being connected in a common circuit supplied with voltage $V_{DC}$ giving a current $i_{dc}$. Although shown as separate the control windings are preferably formed as a single winding common to all the reactor cores, as will be described below. The control circuit includes flux cores to give it the necessary self inductance under fault conditions as illustrated by a winding 16 associated with a core 17. The fluxes in the cores 12 and 13 are indicated by $\phi_1$ and $\phi_2$, respectively, with the subscripts A, B and C for the three phases. The flux in the core 17 is indicated by $\phi_{DC}$.

In a modification shown in FIG. 3 the control circuit is a single loop 20 common to all the reactor cores. The loop 20 is a superconducting coil in which a fixed direct bias current circulates continually without external connections.

In FIG. 4 the physical layout of the circuit shown in FIG. 3 is illustrated schematically. The pairs of reactor cores 12 and 13 for the three phases are arranged to link the single superconducting coil 20 which is provided with nonsaturating air-gap magnetic cores 21 to increase the self-inductance of the direct current winding. The air-gap cores 21 are provided with control windings 22 by means of which the bias flux generated in the cores 12 and 13 by the bias winding 20 can be varied to change the current limiting level as will be described in more detail below. A number of cores 21 are distributed around the superconducting coil 20 and in addition to providing the required self-inductance act as mechanical supports for the coil. Whereas the cores 12 and 13 are shown in FIG. 4 as rectangular cores, they may be toroidal and this would improve the performance of the device by reducing the equivalent series reactance under normal load, reducing losses, and facilitating more accurate control.

It will be appreciated from this description of the principles of the invention and of simple embodiments of the invention that a wide variety of saturable reactor constructions can be designed to give the same fundamental characteristics while at the same time the harmonic contents of the fluxes and currents may be modified to achieve the required overall harmonic content and transient response. Possible modifications include reversed parallel connection of the alternating current coils instead of reversed series connection, multiple cores with phase-shifting connections, additional direct current circuits, and the incorporation of various inductive and capacitive components and filter devices.

Where a transformer and a current limiter are required in the same location, it will be found convenient to mount the two units adjacent to each other, preferably in the same tank with internal connections. FIG. 5 shows how a current limiter in accordance with the invention can be connected with a three-phase autotransformer transmitting power between a supply and a load to protect the load against line surges in the supply. The limiter 26 is connected between the transformer windings 23, 24 and 25 and the neutral point 27 of the supply.

The use of a current-limiting device in accordance with the invention in series with or in combination with a transformer between a supply system and a local distribution system ensures that the fault level becomes a designed proportion of the full load and subsequent increase in the load on the distribution system does not increase the fault level, or short circuit current, to a point where the switch gear rating is inadequate and expensive switch gear has to be replaced. A similar application is the use of the current-limiting device to restrict infeed of fault current into the supply from the synchronous plant of a local user. This would allow current restrictions on the user to be greatly reduced.

A further application of a current-limiting device in accordance with the invention is the use of such a device to connect two electricity supply systems. This restricts any increase in the fault level in each of the systems to an amount determined by the current limit of the limiting device and again avoids the necessity for costly up-rating of switch gear in the two systems to cope with greatly increased fault levels which would occur in the absence of the current-limiting device. Also, by cyclic variation of the current limit of the device it is possible to achieve controlled transfer of power between two supply systems without the need for the two systems to remain in a continuous state of synchronism with one another. Reference is made to FIG. 6 for an explanation of this problem. In the upper part of this Figure there are shown two power systems with equivalent electromotive forces of $E_1$ and $E_2$ connected through a total apparent reactance X. As shown by the vector diagram, the electrical displacement between the two systems is an angle $\theta$. The variation of the power P and current I flowing between the systems as a function of the angle $\theta$ are shown in separate graphs in the lower part of FIG. 6. The shaded areas, where $\theta$ is between 0 and $\pi/2$ or between $3\pi/2$ and $2\pi$ electrical radians, represent regions in which power transfer is possible without instability but outside these regions stability may be lost, resulting in uncontrolled acceleration and retardation of generators and unacceptable increases in currents and voltages in the two systems.

FIG. 7 shows the corresponding situation when the two power systems are linked by way of a current-limiting device. The graphs of current and power transfer are shown in full lines for the case where the limit value of the current is constant. It will be seen that this is a satisfactory condition from the point of view of stability but that the power flow simply oscillates between the two systems. If, however, the limit value of the current is varied cyclically in order to reduce the current flow to a minimal value in alternate half cycles, the current and power flows are as represented in broken lines and there is a uni-directional pulsed flow of power from one system to the other without loss of stability and without synchronous operation of the two systems. The necessary control of the limiting value of the current can be achieved by changing the effective ampere turns of the direct current winding of the current-limiting device. A relatively small energy change is necessary to alter the state of the reactor cores, which have rectangular hysteresis loops, and the super-conducting loop ensures that the total enclosed flux linkage remains constant at all times. For example, control can be effected by varying the direct current supply to the bias winding or by varying the self-inductance of the bias winding by means of a control winding on the associated air-gap flux cores. The latter technique is known as flux pumping and is well known in the art of superconducting windings.

FIG. 8 shows the connection of two systems having equivalent electromotive forces $E_1$ and $E_2$ and frequencies $f + \Delta f$ and $f$, respectively, resulting in a continually varying electrical displacement $\theta$. The systems are each three-phase systems and are connected through a three-phase current-limiting device 30 having a common control winding to which a control current $I_{DC}$ is applied from a control device K, which varies $I_{DC}$ cyclically as a function of $\theta$ as shown in the graph, leading to a corresponding variation in the total power transmitted $P_{TOT}$ as a function of $\theta$. In FIG. 9 three current-limiting devices 31, 32 and 33 are connected in parallel and have control currents $I_{DC1}$, $I_{DC2}$ and $I_{DC3}$, respectively, which, as shown in the graph, follow similar curves (1, 2 and 3) but are displaced with respect to the displacement angle $\theta$. The effect of this is to produce a substantially constant power flow from one system to the other, independent of the variation of $\theta$, as shown by the straight line for $P_{TOT}$ as a function of $\theta$.

When a transient disturbance occurs on a power system, such as a short duration short circuit, the immediate effect is induced oscillations of the relative electrical machine angles of the various generators in the system due to a sudden imbalance between the mechanical torque input to each generator (which usually stays substantially constant), and the electrical torque as dictated by the power system (which can change virtually instantaneously if the system charges). These oscillations cause current and power fluctuations which may or may not be damped out by the system. Well known criteria exist whereby the behaviour of the total system to such a disturbance can be predicted and in particular an evaluation made of whether the system will restore itself, known as a stable situation, or whether the system will increase oscillation until asynchronous running of one or more generators results, known as loss of stability. Application of these criteria to any particular power system is most important to the total system design and dictates the required performance of many system components, for example, the speed of fault clearance by high speed breakers.

The inclusion of current-limiting devices in the system to reduce the fault current levels may, in some circumstances, diminish the electrical restoring torque on the generator rotors and thereby make the system less stable. The problem will be explained with reference to FIGS. 10 and 11. FIG. 10(a) shows a generator G1 feeding power $P_1$ to a large electrical power system S2, where the voltage vectors of the generator and power system are $E_1$ and $E_2$, respectively, and the angle $\theta_1$ between them is the power angle. FIG. 10(b) shows for this system the power P as a function of the power angle $\theta$. The curve $T_e$ shows the electrical torque as a function of $\theta$ while the mechanical torque is constant as shown by the line $T_M$.

If a short duration fault is applied such as is indicated by the arrow F, the machine G1 will accelerate forward as the electrical balancing torque is reduced to zero. However, if after a short period of time the fault is removed, when the generator may have reduced angle $\theta_2$, a strong restoring electrical torque T' would automatically be applied to start decelerating the relative forward movement of the rotor of G1. It will be noted, however, that as the rotor angle continues to move forward, the electrical torque reduces, and if point S is reached before the forward movement has been fully stopped, the restoring torque will disappear, since $T_e$ will become less than $T_M$, and the rotor will continue to accelerate until stability is lost. This forward movement will cease where area $A_1$ equals area $A_2$ (the "equal area criterion"). Thus, in the practice, the stability limit is reached when the initial area $A_1$ equals the total available restoring area FT'S.

FIG. 11(a) shows the addition of a current-limiting device 35 connecting the generator G1 to the system S2. FIG. 11(b) shows the effect of this on the power curve, which is to reduce the restoring area FT'S so that a much shorter fault duration, that is to say a smaller area $A_1$, could cause loss of stability, the situation being identical whether the fault is on the generator or of the system side of the current-limiting device.

The stability problem can be overcome by placing an electrical energy absorbing element in a circuit in parallel with the current-limiting device. In normal operation the voltage drop across the current-limiting device is small and consequently there is little loss of energy to the system in the energy-absorbing element. However the voltage increases in the event of a fault and the energy absorbed may be made sufficiently substantial to damp oscillations of the system. An example is illustrated in FIG. 12, which shows at (a) the addition of an energy-absorbing resistor R in parallel with the device 35 and at (b) the resulting torque curve $T_e$ for a fault occurring on the generator side of the device 35. The rotor will accelerate as before up to the angle $\theta_2$ but once the fault is removed there is an additional very large energy, and hence torque, demand on the generator to supply energy to the resistor, which has a considerable voltage across its terminals. Thus the stability of the system will quickly be restored. If a fault occurs on the system side of the device 35 the generator in effect transfers its load into the resistor R and thus no acceleration occurs. At the time of clearance of the fault there is no substantial change of the angle $\theta_1$ and the system will restore immediately.

As shown in FIG. 13 the normal steady-state losses across the resistor R can be reduced to a very small value by the addition of tuning, non-linear, or biasing devices to the parallel circuit. In this instance a small iron-cored inductance coil L is added in series with resistance R and so designed that, under normal operating conditions, it will present a high impedance to the passage of current into resistance R. However, upon a fault occurring, resulting in the voltage V across the transductor device increasing substantially, the inductance of coil L will saturate and offer little impedance to the absorption of the requisite energy by the resistance R. It will be appreciated that there are many alternative modifications to the parallel circuit across the transductor device which may be adopted to minimise steady state losses in resistance R.

In the circuit of FIG. 14 elements corresponding to those of FIG. 2 have been given the same reference numerals and will not be further described. In order to minimise harmonic currents in the system each reactor core is provided with an additional alternating current mesh winding 37A, 38A; 37B, 38B; or 37C, 38C, the windings on the cores of each pair being connected in series opposition and all six windings being connected together in a closed circuit.

A further advantage of current-limiting devices as described in this specification is that if the over-current disturbance in the power system rises to an undesirably large magnitude, the superconducting control winding will revert to a normal conductivity state, thus greatly increasing the impedance of the device and minimising current flow in the system.

What is claim is:

1. A current-limiting device for an alternating current system comprising for each phase of the system at least two iron-cored saturable reactors, each reactor having an alternating current winding and a direct current super-conducting bias winding, the bias winding being capable of maintaining the core of the reactor saturated under full load alternating current conditions, the alternating current windings in each phase being so arranged and connected that under full load conditions a change in the level of saturation in any one reactor core relative to the bias level due to the bias winding alone is accompanied by a compensating change in saturation level in another core or cores, current limiting occurring when on each half-cycle one or other of the cores is forced out of saturation.

2. A device as claimed in claim 1 in which the alternating current windings in each phase are connected in series with one another.

3. A device as claimed in claim 1 in which the superconducting bias windings of all the reactors are formed by a single superconducting loop.

4. A device as claimed in claim 1 including means for varying the bias level of each reactor.

5. A device as claimed in claim 4 in which the said means includes means for varying the current supply to the bias winding.

6. A device as claimed in claim 4 in which the said means include an air gap magnetic core, linking the bias winding, and a control winding on the said air-gap core.

7. A device as claimed in claim 1 including an alternating current mesh winding of material of normal conductivity linking the cores of all the reactors.

8. A current-limiting device as claimed in claim 1 having an electrical-energy-absorbing element connected in parallel therewith to improve the stability of the alternating current system.

9. A device as claimed in claim 8 in which the electrical-energy-absorbing element is a resistor.

10. A device as claimed in claim 9 having an inductive element in series with the resistor to minimize energy loss under full load conditions.

11. A power transfer system comprising two electrical power supply systems connected through a current-limiting device as claimed in claim 4, and a control device cyclically varying the bias level of the current limiting device as a function of the phase angle between the systems between upper and lower levels such that pulsed power transfer takes place between the supply systems.

12. A power transfer system as claimed in claim 11 having three current-limiting devices connected in parallel between the supply systems and having a similar cyclic variation of bias level in each current-limiting device but offset by 120° from one device to the next to produce a substantially constant level of power transfer.

13. A method of current limiting in an alternating current line or network comprising connecting in series in the line or network an iron-cored inductive choke device provided with a superconducting direct current biasing winding whereby under normal full load conditions the device operates entirely in the region of saturation and has a low impedance whilst upon increase of current the device is forced out of saturation on alternate half cycles and reacts to present substantial impedence to the excess current.

14. A current limiting device for a three-phase alternating current system comprising three pairs of iron-cored saturable reactors, the two cores of each pair each carrying an alternating current winding and these two windings being series-connected in one phase of the system in such a manner as to produce opposed flux changes in the two cores, a single turn direct-current superconducting bias winding linking the six reactor cores, at least one air-gap magnetic core linked by the bias winding, said bias winding saturating said reactor cores under normal full alternating current load conditions, whereby current-limiting is effected when excess current drives each core out of saturation on alternate half cycles and thereby creates large flux changes.

15. A current-limiting device as claimed in claim 14 having an alternating current mesh winding comprising six windings, one on each iron-cored saturable reactor, whereby harmonic currents in the line or network are minimized.

16. A current-limiting device in accordance with claim 1 and further including an air-gap magnetic core linking the bias winding.

* * * * *